United States Patent [19]
Cowx

[11] Patent Number: 5,634,960
[45] Date of Patent: Jun. 3, 1997

[54] SCRAP MELTING IN A SUBMERGED ARC FURNACE

[75] Inventor: Peter Cowx, Oslo, Norway

[73] Assignee: Elkem A/S, Norway

[21] Appl. No.: 389,359

[22] Filed: Feb. 16, 1995

[51] Int. Cl.[6] .................................. C21B 11/10
[52] U.S. Cl. ....................... 75/10.42; 75/10.5; 420/29
[58] Field of Search ................... 75/10.5, 10.66, 75/10.61, 10.41, 10.42; 420/29

[56] References Cited

U.S. PATENT DOCUMENTS

| | | | |
|---|---|---|---|
| 3,385,494 | 5/1968 | Themelis et al. | 75/10.5 |
| 3,665,085 | 5/1972 | Dumont-Fillon . | |
| 4,022,612 | 5/1977 | Bleloch | 75/10.63 |
| 4,119,454 | 10/1978 | Rath . | |
| 4,252,559 | 2/1981 | Allain | 75/10.61 |
| 4,340,420 | 7/1982 | Santen et al. | 75/10.63 |
| 4,423,514 | 12/1983 | Davene . | |
| 4,483,709 | 11/1984 | Schempp et al. | 75/10.63 |
| 4,490,172 | 12/1984 | Moore et al. | 75/546 |
| 4,588,436 | 5/1986 | Eriksson et al. | 75/10.19 |
| 4,971,623 | 11/1990 | Wilford | 75/10.6 |

FOREIGN PATENT DOCUMENTS

| | | | |
|---|---|---|---|
| 0033937 | 9/1978 | Japan | 75/10.5 |

*Primary Examiner*—Melvyn Andrews
*Attorney, Agent, or Firm*—Lucas & Just

[57] ABSTRACT

The process feeds a mixture of scrap metal, quartzite, carbonaceous material and wood chips to a submerged arc furnace to make a base iron suitable for iron foundry purposes. The mixture contains 1 to 20% quartzite, 5 to 15% carbonaceous material, 0 to 10% wood chips, all based on the weight of scrap in the mixture. By maintaining the charge in the furnace, good efficiencies are obtained.

11 Claims, 1 Drawing Sheet

SUBMERGED ARC FURNACE

SUBMERGED ARC FURNACE

SCRAP MELTING IN A SUBMERGED ARC FURNACE

This invention relates to the continuous melting of ferrous scrap metal and in a submerged arc furnace to obtain metal suitable for iron foundry purposes.

The use of electric furnaces for melting scrap and producing iron is known U.S. Pat. No. 3,665,085 issued May 23, 1972 and U.S. Pat. No. 4,423,514 issued Dec. 27, 1983 both teach a continuous process for melting scrap iron in an electric arc furnace. In both the '085 and '514 patents, the electrode is positioned above the molten material in the furnace and the charge to the furnace is scrap metal only, U.S. Pat. No. 4,119,454 issued Oct. 10, 1978 also teaches the use of an electric arc furnace for melting scrap. However, the electrode in the '454 patent is positioned in the molten material. In all three U.S. patents scrap metal is the only charge to the furnace.

Submerged arc furnaces are conventionally used for the manufacture of ferroalloys, phosphorus, silicon metal, calcium carbide and pig iron, and for the production of matte of copper, nickel and the platinum group elements typically. Such submerged arc furnaces use either self-baking Söderberg electrodes or probaked electrodes. Submerged arc furnaces have been used in the past to produce silvery pig iron (iron containing typically 10–20% silicon) using a high percentage of scrap charged to the furnace. The use of a submerged arc furnace charged with ferrous scrap only has not been tested heretofore although it has been suggested as a possible means for processing ferrous scrap iron.

It has now been discovered that a submerged arc furnace can be used to process ferrous scrap iron to produce pig iron suitable for making base iron for foundry purposes. It has been found that this ferrous scrap metal can be charged to the furnace with a minimal amount of wood chips without bridging or arcing instabilities. Furthermore, contaminants can be controlled in a number of ways. Contaminants come from the scrap metal and in order to produce a commercially viable process, they must be controlled. Using a submerged arc furnace, the contaminants are controlled by one or more of the following means (1) proper pre-selection of the charge to the furnace; (2) blowing oxygen containing gas into the charge in the furnace; (3) use of slag in the furnace; and (4) treatment of the molten metal as tapped from the furnace.

Broadly, the process of the present invention entails a method for continuously converting scrap metal into a foundry grade base iron in a submerged arc furnace, said furnace having one or more electrodes positioned immediately above the molten layer in said furnace, the improvement comprising:

(a) feeding in order to charge said furnace a mixture with composition subject to the composition of feed components and subject to ductile iron base requirements, typically about 5% by weight of scrap of quartzite, about 10% by weight of scrap of carbonaceous material and a portion of wood chips to accommodate the type of scrap being used to accomplish are stability and easy movement of charge within the furnace, and remainder of ferrous scrap, wherein said scrap may comprise 80–99% and typically about 95% by weight iron.

(b) maintaining a layer of charge of said mixture above said molten layer in said furnace such that said electrode or electrodes are surrounded by said charge and such that said charge covers the molten layer in said furnace, and (c) tapping said furnace to remove a molten iron, suitable for foundry iron purposes, having a silicon content of about 0.5–4% by weight, and a carbon content of about 2–5% by weight.

Figure 1:
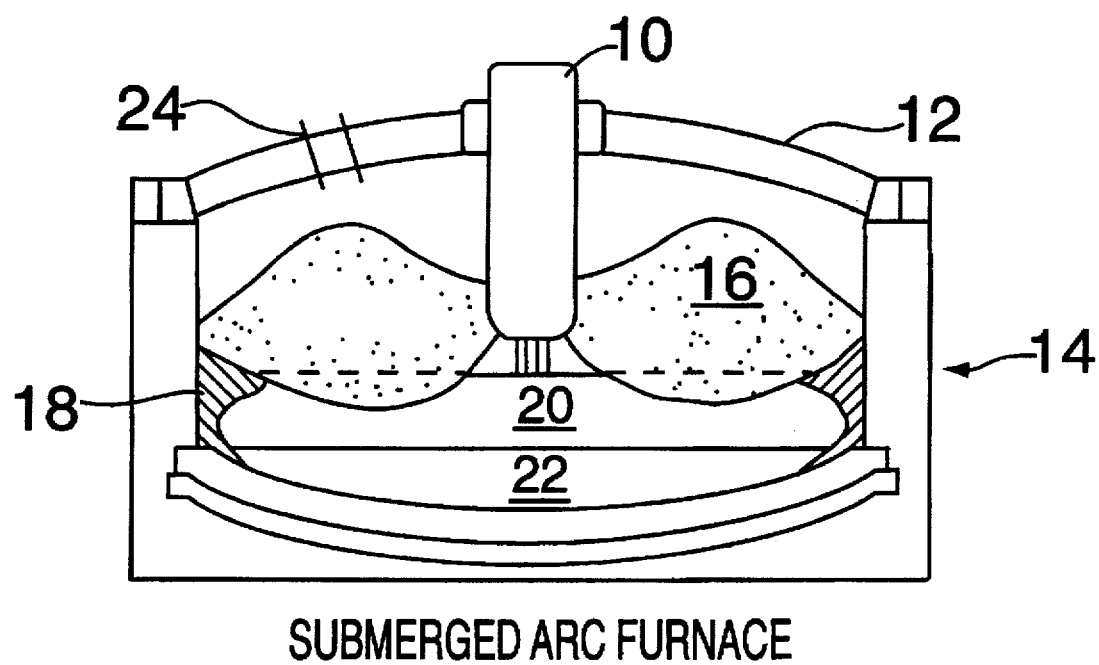
FIG. 1 illustrate a submerged arc furnace for carrying out the process of the present invention.

The charge to the furnace should be a mixture of quartzite, ferrous scrap metal, carbonaceous material and wood chips, if desired, in the appropriate amounts. Forming the mixture is done in a conventional manner using conventional means.

The appropriate amount of ferrous scrap metal in the mixture shout make up 80% or more of the mixture. The iron content of the ferrous scrap should be about 80% to about 99% by weight and, more preferably, about 95% by weight of the scrap. The ferrous scrap should preferably be in particulate form, typical of shredded ferrous scrap, that is with a particle size about 1 mm to about 20 mm, but the process can accept scrap up to 155 mm depending on furnace size and charging equipment.

The quartzite used in the charge should be in a particulate form measuring about 1 mm to about 50 mm and, more preferably, about 5 mm or less in size. However, particle size outside this range may be accepted subject to particle size of other charge materials. Any conventional source of quartzite can be used. The mount of quartzite that should be used in the charge is about 1% to about 20% by weight of scrap and it has been found that using 5% by weight of scrap of quartzite produces acceptable results. Naturally, the amount of quartzite in the charge is adjusted based on the silicon content of the scrap so as to provide a molten metal having a silicon content of about 2% by weight.

The carbonaceous material used in the present invention is about 5% to about 15% by weight scrap and, more preferably, about 10% or less by weight scrap. Any conventional source of carbonaceous material can be used such as coal or preferably coke, and good results have been obtained using coke. The carbonaceous material preferably has a size of about 1 mm to about 50 mm and good results have been obtained using coke which has a particle size of about 3 mm. The amount of carbonaceous material used in the charge will depend upon the amount of carbon in the scrap, on required carbon and silicon content in the metal and the amount of carbon reporting to the furnace gas. Good results have been obtained using about 6% by weight of scrap of a carbonaceous material.

Wood chips can be added to the charge to control the conductivity and to control solid feed charge flowability properties in the submerged arc furnace. It has been found that wood chips in an amount of 4% based on the weight of scrap in the charge gives satisfactory operation in a small furnace. More specifically, the amount of wood chips used in the charge can be about 10% to about 0% by weight of scrap. If wood chips are used, they should have a size of about 30 to about 180 mm and, more preferably, they should have their largest dimension measuring about 75 mm.

Wood chips can be partly or fully substituted by other solid organic materials like coconut shells, rice hulls, automobile fluff (mainly plastic material obtained in shredding automobiles), etc.

In order to control contaminants that are introduced with charged materials into the furnace, one or more methods as outlined herein must be employed. These methods include proper preselection of raw materials for the furnace, blowing oxygen containing gas into the charge contained in the furnace, using slag in the furnace and treating the molten metal as it is tapped from the furnace in the ladle or the launder.

Preselecting of the materials used to form the charge to the furnace is done in a conventional manner such as by performing chemical analysis on the materials used to form the charge and determining and controlling their chemical makeup. This is especially well suited for controlling the sulfur, calcium and aluminum content, and to some extent also phosphorus, chromium, manganese, tin and titanium content of the molten metal tapped from the furnace. Additionally, a pure source of iron such as direct reduced iron ore, or clean unreduced iron ore can be added to the charge in order to dilute the contaminants thereby producing a molten iron in the furnace with a low level of contaminants.

Oxygen containing gas can be blown into the standing charge or the molten phase in the furnace, in order to control some of the contaminants in the charge. Oxygen blowing into the charge is done in a conventional manner using conventional means. By blowing oxygen containing gas into the furnace, aluminum, calcium and to some extent other contaminant elements, such as chromium, manganese, lead and cadmium, can be oxidized and transferred to the slag or gas phase. Zinc can in the same way be oxidized to zinc oxide and leave the furnace as a dust and can readily be collected in a bag house or other conventional gas ticketing means. Oxygen containing gas blowing will also help combust the carbon monoxide and hydrogen gas formed in the furnace.

The use of slag in the furnace to control contaminants is done in a conventional manner. Use of slag in the furnace will help to control the sulfur, calcium, aluminum, manganese and chromium in the charge. Specifically, these contaminants will end up in the slag thereby reducing their concentration in the molten metal. Since the scrap charge to the furnace is fairly pure, it is preferred to use a synthetic slag such as 50–60% by weight CaO, 20–40% by weight SiO2 and 5–15% by weight MgO and to charge the same to the furnace in order to cream a slag layer on top of the molten metal layer.

Removing contaminants from tapped metal in the ladle or launder is done in a conventional manner using conventional means. Specifically, the molten metal as tapped from the furnace can be treated with synthetic slag or with calcium carbide to reduce the metal's sulphur content. Calcium, aluminun, chromium, manganese and phosphorus can be decreased by synthetic slag treatment and by preferential oxidation. i.e. blowing the iron with oxygen containing gas.

The operation of the furnace itself is best understood by reference to the submerged arc furnace as shown in FIG. 1.

As shown in FIG. 1, the electrode or electrodes 10 extend through roof 12 of france 14. In a closed sealed furnace configuration, as shown in FIG. 1, charge 16 sits on top, partly submerged in molten layer 18 and molten layer 18 is made up of slag layer 20 and metal layer 22. Charge 16 is added to the furnace through ports 24 which are positioned in the furnace roof 12. In an open furnace configuration the solid charge and molten phase configuration is similar to the closed sealed furnace configurations. However, in the open furnace configuration charge is added to the furnace through ports in the furnace cover and/or by mechanical charging equipment. The furnace can be designed and operated in alternate current mode with one or more top electrodes, or in a direct current mode, typically with one top electrode and one bottom contact. Molten metal layer 22 is tapped continuously or intermittently from furnace 14 in a conventional manner using amp hole not shown in FIG. 1.

Molten slag is tapped from furnace 14 in a conventional manner using a tap hole which is positioned above the metal tap hole. The slag tap hole is also not shown in FIG. 1.

The use of a submerged arc furnace provides a number of benefits to the melting of ferrous scrap metal to molten iron. Namely, it provides improved thermal functionality because the heat from the furnace gas is transferred to the standing scrap charge which rests on top, partly submerged in the molten layer 18 in the furnace and the scrap protects the side walls and the roof from arc radiation. The improved energy efficiency of the method of the present invention compared with conventional arc furnaces applies to preheating of solid charge in the furnace and, reduced heat losses due to radiation, because the furnace side wall and roof are protected from radiation by the solid charge. In addition the in-situ production of ferrosilicon, instead of adding cold ferrosilicon to the metal, further improves the energy efficiency. As will be appreciated by those of skill in the art, the scrap charge can be continuously added to the furnace so as to maintain a high level of charge in the furnace. The benefit of using quartzite in the charge is that ferrosilicon is produced in-situ and them is no need or a reduced need to add ferrosilicon to the metal in order to make the metal suitable as a foundry base iron.

In operating the submerged arc furnace in accordance with the present invention, it has been found that the shorter the arc length the higher the temperature in the metal. Thus, the temperature in the metal is controlled by the arc length. The arc length is the distance between the tip of the electrode and the top of the molten layer 18. The arc length is subject to furnace size, electrode diameter, electrode spacing and charge electrical conductivity properties.

By using the submerged am furnace in accordance with the present invention, the electric energy utilization efficiency of a small furnace was demonstrated to be 60 to 65%, and is expected to be 80–90% in a large industrial scale furnace.

The electrodes used in accordance with the submerged arc furnace of the present invention can be probaked electrodes or continuous baked Söderberg electrodes. It will be appreciated by those of skill in the art that the use of the Söderberg electrodes will provide substantial cost benefit. It has been found that the high level of charge which runs up the side of the electrode protects the electrode side wall from oxidation.

The metal temperature in the furnace, is subject to composition and should be about 1300° C. to about 1600° C. and, more preferably, about 1420° C. to about 1500° C.

It has been found that by using the submerged arc furnace in accordance with the present invention an iron for foundry purposes having about 3% carbon and 2% silicon can be produced. This metal can after desulphurization and possibly further treatment for example, be inoculated in a conventional manner using a conventional inoculant to produce a ductile iron.

It will be understood that the claims are intended to cover all changes and modifications of the preferred embodiment of the invention herein chosen for the purpose of illustration which do not constitute a departure from the spirit and scope of the invention.

I claim:

1. A method for continuously converting ferrous scrap metal into an iron for foundry purposes comprising the steps of:
   (a) feeding to a submerged arc open or closed furnace having one or more electrodes a charge comprising:
      (i) ferrous scrap metal wherein said scrap metal comprises 80–99% by weight scrap iron,
      (ii) about 1 to about 20% by weight scrap of quartzite,
      (iii) about 5 to about 15% by weight scrap of carbonaceous material, and (iv) about 0 to about 10% by weight scrap of wood chips;

(b) melting said charge in said furnace such that said furnace contains a molten layer and a layer of solid charge above said molten layer;

(c) positioning said one or more electrodes immediately above said molten layer;

(d) maintaining said layer of solid charge in said furnace such that said layer of solid charge completely covers said molten layer and extends from the side walls of said furnace to surround said one or more electrodes; and (e) tapping said furnace to remove from said molten layer a molten iron suitable for foundry purposes and having a silicon content of about 0.5 to about 4% by weight and a carbon content of about 2 to about 5% by weight.

2. The method of claim 1 wherein said molten layer comprises a slag layer and a metal layer positioned below said slag layer such that sulphur, aluminum, calcium and other contaminant elements can be partly removed from the metal.

3. The method of claim 1 further comprising the step of treating the molten iron tapped from the furnace with either calcium carbide, magnesium or synthetic slag.

4. The method of claim 2 further comprising the step of adding synthetic slag to the furnace to produce a slag layer on top of the molten metal layer.

5. The method of claim 1 wherein said carbonaceous material is coke or coal.

6. The method of claim 1 wherein the electrode or electrodes are a Søderberg type electrode.

7. The method of claim 1 wherein said carbonaceous material and said quartzite is as low as possible in impurities.

8. The method of claim 1 further comprising the step of blowing oxygen containing gas through the solid charge or the molten layer to reduce the content in the metal of impurities selected from the group consisting of calcium, aluminum, chromium, manganese, zinc, lead and cadmium.

9. The method of claim 1 further comprising the step of adding either iron ore or direct reduced iron ore to the charge.

10. The method of claim 1 wherein the wood chips have been partially or fully replaced with other solid organic material for controlling conductivity and flowability properties of said charge in the submerged arc furnace.

11. The method of claim 10 wherein the solid organic material is selected from the group consisting of coconut shells, rice hulls, and automobile fluff.

* * * * *

UNITED STATES PATENT AND TRADEMARK OFFICE
CERTIFICATE OF CORRECTION

PATENT NO. : 5,634,960
DATED : June 3, 1997
INVENTOR(S) : Peter Cowx

It is certified that error appears in the above-indentified patent and that said Letters Patent is hereby corrected as shown below:

Column 1, line 8, after "known" insert --.--;  line 24, change "probaked" to --prebaked--; line 38, after "and" insert --,--, line 57, change "are" to --arc--.

Column 2, line 4, change "illustrate" to --illustrates--; line 25, change "mount" to --amount--.

Column 3, line 14, after "charge" insert --,--; line 23, change "ticketing" to --filtering--; line 36, change "cream" to --create--; line 43, change "aluminun" to --aluminum--; line 49, change "france" to --furnace--; line 64, change "amp" to --a tap--.

Column 4, line 18, change "them" to --there--; line 23, change "are" to --arc--; line 25, change "are" to --arc--; line 29, change "am" to --arc--; line 35, change "probaked" to --prebaked--.

Column 5, line 19 (claim 2), before "metal" insert --molten--.

Signed and Sealed this

Sixteenth Day of September, 1997

Attest:

BRUCE LEHMAN

*Attesting Officer*     *Commissioner of Patents and Trademarks*